United States Patent [19]

Sugiyama

[11] Patent Number: 4,769,521
[45] Date of Patent: Sep. 6, 1988

[54] SMALL TIG-ARC WELDING TORCH

[75] Inventor: Hisao Sugiyama, Nagoya, Japan

[73] Assignee: Mitsubishi Denki Kabushiki Kaisha, Tokyo, Japan

[21] Appl. No.: 12,235

[22] Filed: Feb. 9, 1987

[30] Foreign Application Priority Data

Apr. 25, 1986 [JP] Japan .................. 61-61673[U]
Apr. 30, 1986 [JP] Japan .................. 61-64201[U]

[51] Int. Cl.⁴ .......................... B23K 9/28; B23K 9/16
[52] U.S. Cl. .................................. 219/75; 219/136
[58] Field of Search ............. 219/74, 75, 136, 137 R

[56] References Cited

U.S. PATENT DOCUMENTS

| | | | |
|---|---|---|---|
| 3,288,980 | 11/1966 | Rohrberg et al. | 219/75 X |
| 3,525,845 | 8/1970 | Sipos | 219/75 |
| 3,604,889 | 9/1971 | Rohrberg | 219/74 X |
| 4,296,308 | 10/1981 | Nakahama et al. | 219/136 |
| 4,517,433 | 5/1985 | Chmela | 219/75 |
| 4,581,518 | 4/1986 | Takahashi et al. | 219/136 X |

Primary Examiner—E. A. Goldberg
Attorney, Agent, or Firm—Armstrong, Nikaido, Marmelstein & Kubovcik

[57] ABSTRACT

A small TIG-arc welding torch which can be well applied for welding of a narrow portion and allow production of a small welding apparatus which is superior in insulation. The welding torch comprises a heat resisting insulator case which covers the entire welding torch except a portion of an electrode. The insulator case has one or a plurality of shield gas spouting holes formed therein through which gas is spouted such that flows or fluxes of gas may surround and isolate the electrode and a welding area around it from the open air.

3 Claims, 3 Drawing Sheets

SMALL TIG-ARC WELDING TORCH

BACKGROUND OF THE INVENTION

This invention relates to a small TIG-arc welding torch.

A typical one of conventional small TIG-arc torches is shown in FIGS. 3a and 3b. Referring to FIGS. 3a and 3b, the small TIG-arc welding torch shown includes a torch body 1, an electrode holder 2 screwed into the torch body 1 and having a collet 3 for securing an electrode 4 in position on the electrode holder 3a by means of a cap 5 screwed into the electrode holder 2, and an O ring 6 for preventing shield gas from leaking from between threaded engaging portions of the electrode holder 2 and the cap 5. The small TIG-arc welding torch further includes a nipple 7 for supplying to the torch body 1 a welding electric current supplied thereto from a welding power supply (not shown) by way of a cable 8 and for supplying to the interior of the torch body 1 shield gas supplied thereto passing through a gap between a hose 9 and the cable 8. The cable 8 is secured to the nipple 7.

Shield gas supplied to the torch body 1 passes through holes 2a formed in the electrode holder 2 and flows into a spacing provided at the center of the electrode holder 2 and is then discharged outwardly of the electrode holder 2 through other holes 2b formed in the electrode holder 2. Shield gas thus discharged outwardly of the electrode holder 2 is moderated in flowing velocity by a gas lens 10 and then rectified by a nozzle 11 and is then discharged outwardly of the torch body 1 to protect the electrode 4 red-heated for welding and a welding area around it from the open air. The small TIG-arc welding torch further includes an insulating plate 12 for insulating the torch body 1 from a welding jig or tool (not shown) and a screw 13 for securely fixing the torch body 1 to the insulating plate 12.

Conventionally, a welding operation is conducted using a small TIG-arc welding machine having such a construction as described above.

However, in such a small TIG-arc welding torch as described above, a metal element which constitutes the torch body is exposed as seen in FIG. 3a. Consequently, if the torch body is brought into contact with or is positioned near an object for welding or an electric conductor which has a higher potential than a welding electric current supplied to the torch body, an arc may appear between the torch body and the object for welding or the conductor and thus damage the torch body. Accordingly, it is difficult to apply the conventional small TIG-arc welding torch for welding of a narrow portion below 20 mm or so.

SUMMARY OF THE INVENTION

It is an object of the present invention to provide a small TIG-arc welding torch which can be well applied for welding of a narrow portion and allow production of a small welding apparatus which is superior in insulation.

In order to attain the object, according to the present invention, there is provided a small TIG-arc welding torch, comprising a body having a shield gas receiving means and a welding electric current receiving means, an electrode, holding means for holding said electrode on said body, and a heat resisting insulator case for accommodating said small TIG-arc welding torch therein, said insulator case having a hole formed therein through which said electrode is exposed and extends outwardly of said insulator case.

Accordingly, since the entire small TIG-arc welding torch except part of the electrode which is an arc generating source is accommodated in the heat resisting insulator case, there is little or no possibility of a short-circuiting accident even upon welding of a narrow portion. Besides, since part of the insulator case serves also as a nozzle for shield gas, the small TIG-arc welding torch of the invention can be produced at a low cost.

The above and other objects, features and advantages of the present invention will become apparent from the following description and the appended claims, taken in conjunction with the accompanying drawing.

DESCRIPTION OF THE PREFERRED EMBODIMENTS

Figure 3A:
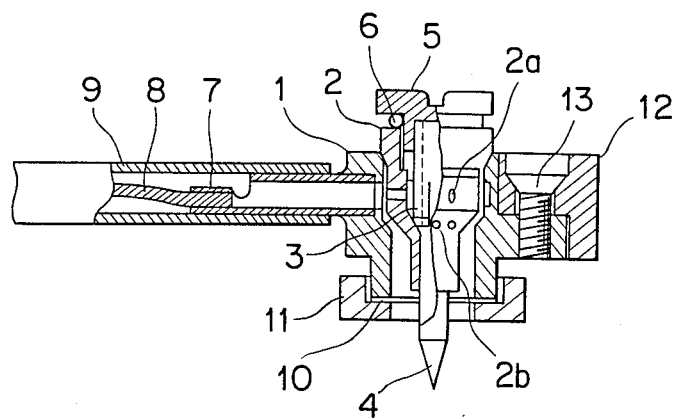
FIGS. 3a and 3b illustrate a typical one of conventional small TIG-arc welding torches, and FIG. 3a being a vertical sectional, and FIG. 3b a bottom plan view.
Figure 3B:
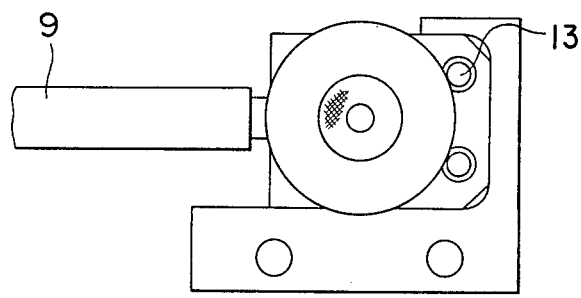

Referring to FIGS. 1a to 1d, there is illustrated a small TIG-arc welding torch according to a first embodiment of the present invention. In those figures, like parts or components are denoted by like reference numerals to those of FIGS. 3a and 3b.

The small TIG-arc welding torch shown includes a torch body 1, an electrode holder 2, a collet 3, an electrode 4, a cap 5, a nipple 7, a cable 8, a hose 9 and a gas lens 10. The elements listed are all similar to the corresponding elements of the conventional small TIG-arc welding torch described hereinabove in conjunction with FIGS. 3a and 3b, and therefore, description of them is omitted herein. The small TIG-arc welding torch of FIGS. 1a to 1d further includes a heat resisting insulator case 14 having therein a hollow spacing in which the torch body 1 can be accommodated. The torch body 1 is securely fixed to the insulator case 14 by means of a screw 15. A shield washer 16 is fitted on the screw 15 such that it may prevent leakage of shield gas from a loose hole for the screw 15 formed in the insulator case 4. A heat resisting adhesive tape segment 17 is applied to the top of the insulator case 4 such that it may prevent leakage of shield gas from an insertion hole for the collet 3 formed in the insulator case 14. An O ring 6 is fitted on the torch body 1 such that it may prevent leakage of shield gas from a gap between the insulator case 14 and the torch body 1.

Thus, shield gas supplied into the torch body 1 then passes through holes 1a formed in the torch body 1 and is moderated in flowing velocity by the gas lens 10 whereafter it is discharged outwardly of the insulator case 14 passing through gas spouting holes 14a formed in the insulator case 14.

It is to be noted that the gas spouting holes 14a are formed in the insulator case 14 in a circumferentially equidistantly spaced relationship from each other around the electrode 4 which extends downwardly below the insulator case 14 through a hole 14b also formed in the insulator case 14. Accordingly, shield gas which has been spouted from the spouting holes 14a in the insulator case 14 surrounds and hence protects the electrode 4 red-heated for welding and a welding area around it.

Figure 1A:
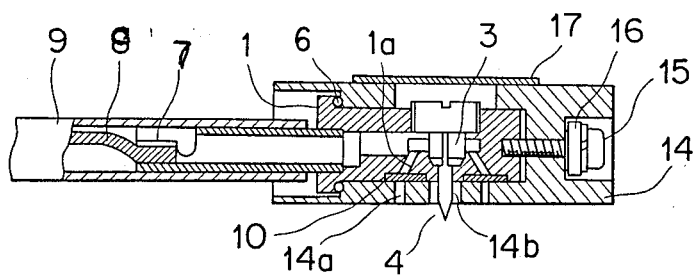
FIGS. 1a to 1d illustrate a small TIG-arc welding torch according to a first embodiment of the present invention, and FIG. 1a being a vertical sectional view, FIG. 1b a bottom plan view, FIG. 1c a right-hand side elevational view, and FIG. 1d an enlarged partial vertical sectional view illustrating, in diagrammatic representation, flows of gas spouting from the small TIG-arc welding torch.
Figure 1B:
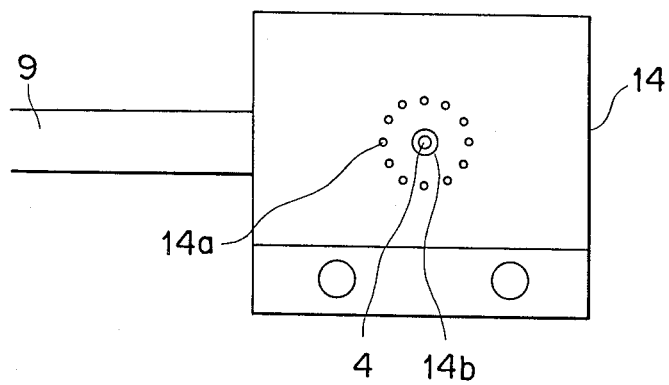
Figure 1C:
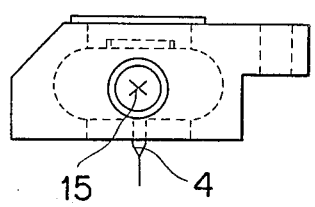
Figure 1D:
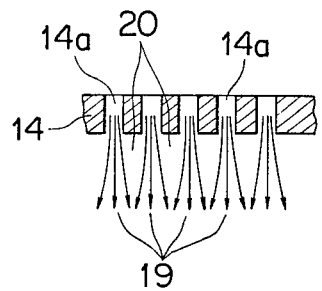
Figure 2A:
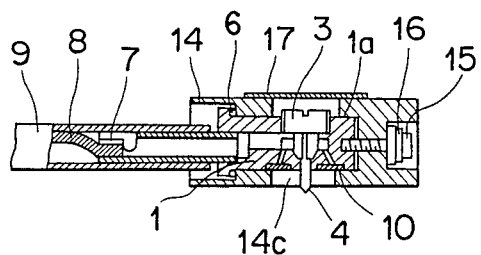
FIGS. 2a to 2d illustrate a small TIG-arc welding torch according to a second embodiment of the invention, and FIG. 2a being a vertical sectional view, FIG. 2b a bottom plan view, FIG. 2c a right-hand side elevational view, and FIG. 2d an enlarged partial vertical sectional view illustrating, in diagrammatic representation, flows of gas spouting from the small TIG-arc welding torch.
Figure 2B:
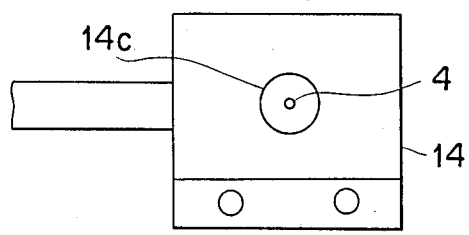
Figure 2C:
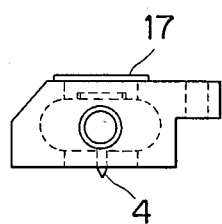
Figure 2D:
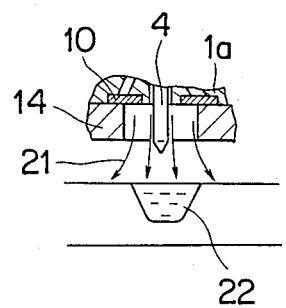

In this instance, shield gas spouted from the spouting holes 14a will flow in gas flow fluxes as indicated by arrow marks 19 in FIG. 1d. Accordingly, at locations denoted at 20 just below the shield case 14 between the gas spouting holes 14a, shield gas may be somewhat lean.

Referring now to FIGS. 2a to 2d, there is illustrated a small TIG-arc welding torch according to a second embodiment of the invention which is improved such that a location at which shield gas may possibly be lean is eliminated. It is to be noted that like parts or components are denoted by like reference numerals to those of the first embodiment of FIGS. 1a to 1d. Since the small TIG-arc welding torch of FIGS. 2a to 2d is similar in construction to that of FIGS. 1a to 1d and is only different in structure of an insulator case 14, description will be given only of the insulator case 14 herein.

While the insulator case 14 of the small TIG-arc welding torch of FIGS. 1a to 1d has the circumferentially equidistantly spaced gas spouting holes 14a and the central hole 14b formed therein, the insulator case 14 of the small TIG-arc welding torch of FIGS. 2a to 2d has a single gas spouting hole 14c formed therein instead. Thus the electrode 4 passing through the torch body 1 is located at the center of and extends downwardly through and below the gas spouting hole 14c of the insulator casing 14. The gas spouting hole 14c is formed in a concentrical relationship with the electrode 4 and greater in diameter than a molten pool 22 which is formed upon welding.

Thus, shield gas fed into the torch body 1 from the hose 9 is moderated in flowing velocity by the gas lens 10 and is then spouted from the gas spouting hole 14c formed in the insulator case 14. In this instance, shield gas spouted from the spouting holes 14a will flow in gas flow fluxes as indicated by arrow marks 21 in FIG. 1d and thus completely surround the red-heated electrode 4 and a welding area around it including a molten pool 22, thereby completely isolating the red-heated electrode 4 and the welding area around it from external air which will have a bad influence thereon.

Having now fully described the invention, it will be apparent to those of ordinary skill in the art that many changes and modifications can be made thereto without departing from the spirit and scope of the invention as set forth herein.

What is claimed is:

1. A small TIG-arc welding torch, comprising a body having a shield gas receiving means and a welding electric current receiving means, an electrode, holding means for holding said electrode on said body, and a heat resisting insulator case on said body around said small TIG-arc welding torch, said insulator case having a hole formed therein through which said electrode extends for exposure outwardly of said insulator case, said body having a plurality of shield gas holes formed therein in a spaced relationship from each other around said electrode and opening outwardly of said body into circumferentially equidistantly spaced gas spouting holes in said insulator case for forming a cylindrical shield of said gas around said electrode, each of said shield gas holes having mounted therein at said opening into said gas spouting holes a gas lens for moderating the flow of shielding gas therethrough.

2. A small TIG-arc welding torch according to claim 1, wherein said hole of said insulator case through which said electrode extends outwardly of said insulator case serves as a shield gas spouting hole and is formed in a concentrical circular relationship with said electrode having a greater diameter than that of a molten pool formed in an object being welded by an arc of said electrode.

3. A small TIG-arc welding torch according to claim 1, wherein said holding means includes a collet for holding said electrode thereon, and said insulator case has an insertion hole formed therein through which said collet is securely screwed into said body, said insulator case having a heat resisting adhesive member applied thereto to prevent shield gas from leaking through said insertion hole in said insulator case.

* * * * *